Aug. 30, 1932.  F. HARKER  1,874,986
PORTABLE EYE TESTING APPARATUS
Filed April 29, 1930  2 Sheets-Sheet 1
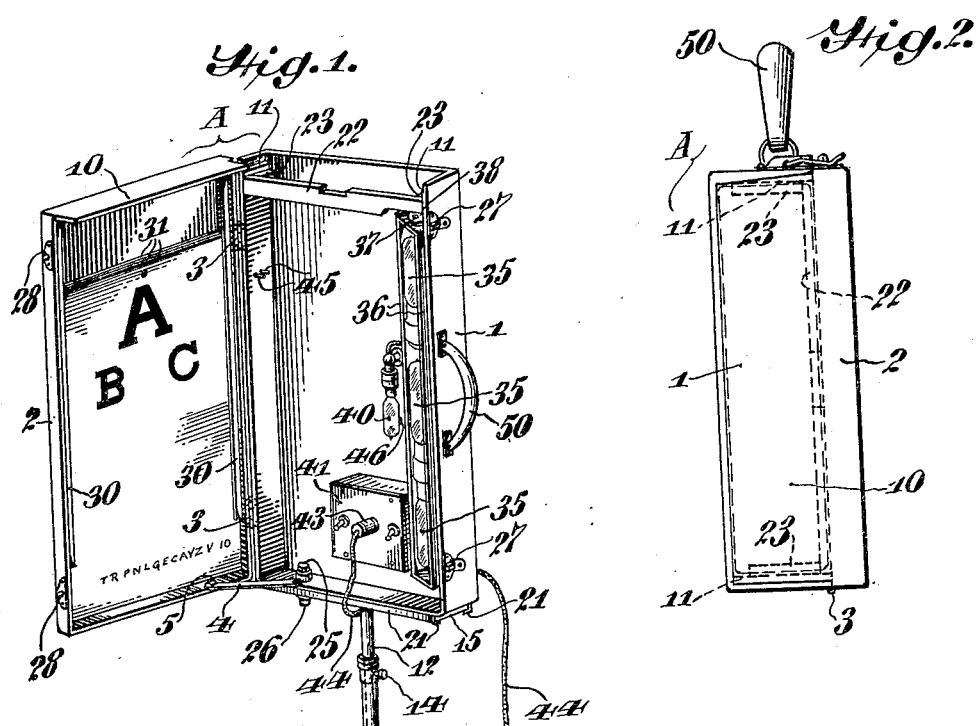
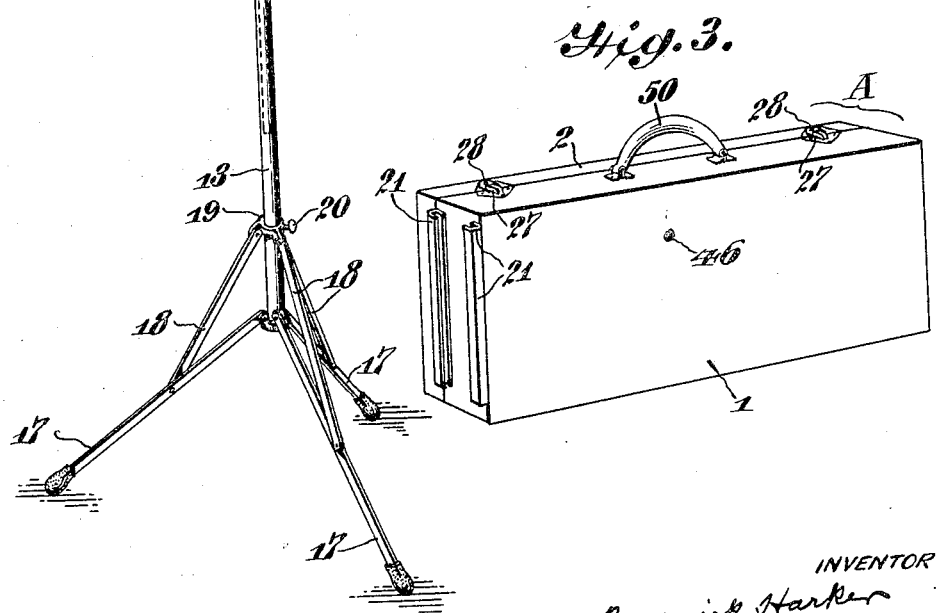
INVENTOR
Frederick Harker
BY Cyrus N. Anderson
Attorney Aug. 30, 1932.  F. HARKER  1,874,986
PORTABLE EYE TESTING APPARATUS
Filed April 29, 1930   2 Sheets-Sheet 2
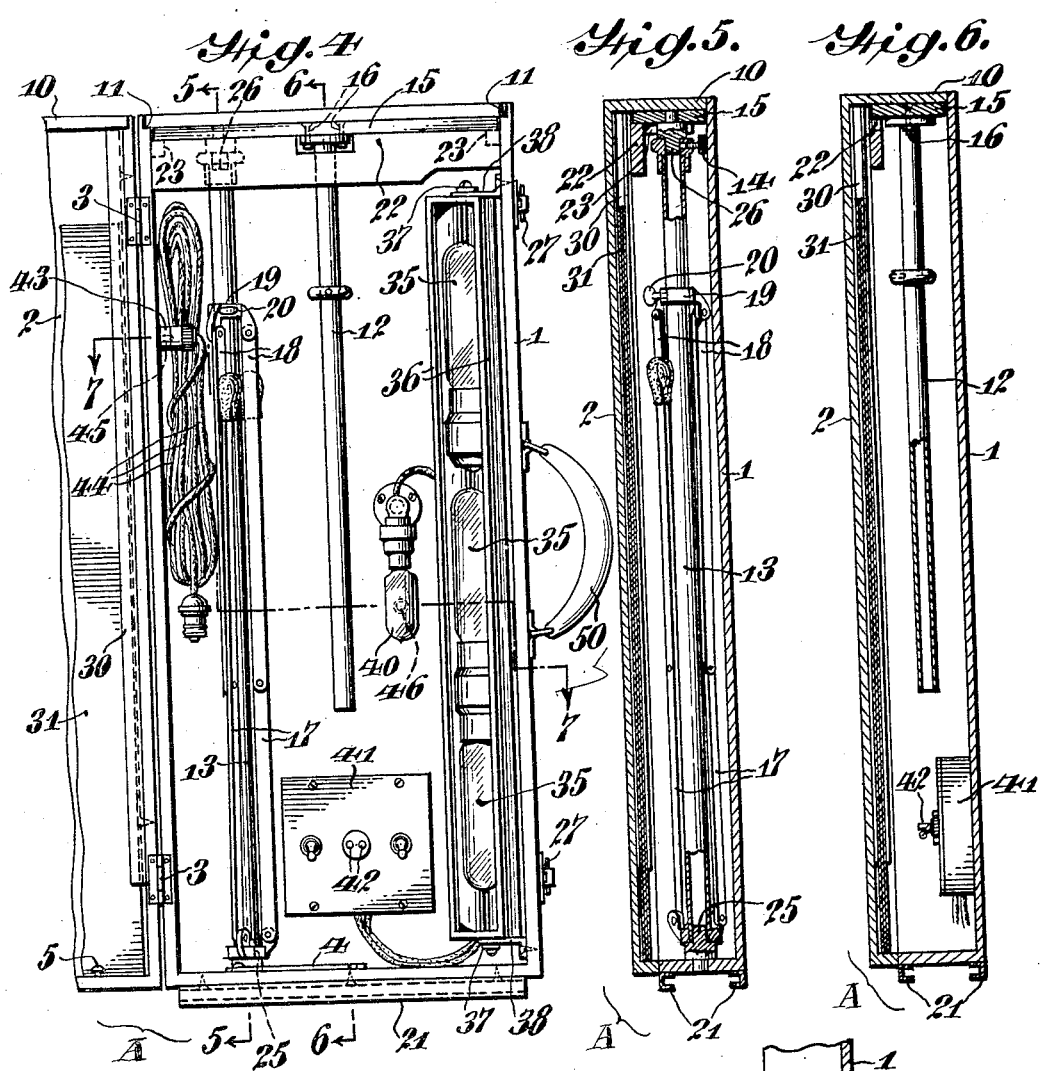

Patented Aug. 30, 1932

1,874,986

UNITED STATES PATENT OFFICE

FREDERICK HARKER, OF SOUTH ARDMORE, PENNSYLVANIA, ASSIGNOR TO WALL & OCHS, INCORPORATED, OF PHILADELPHIA, PENNSYLVANIA, A CORPORATION OF PENNSYLVANIA

PORTABLE EYE TESTING APPARATUS

Application filed April 29, 1930. Serial No. 448,219.

In some cases it may become necessary for an occulist, optician or other person to make an examination of a person's eyes at some place other than his office, and in any such case it is and will be desirable that he have available an eye testing apparatus or device.

To meet such a condition and to provide means whereby a person under such circumstances may avail himself of an eye testing apparatus I have invented and constructed such an apparatus or device which is portable.

It is a general object of my invention to provide an eye testing apparatus or device which is portable and which at the same time embodies novel features of construction which render it highly desirable and efficient in the examination of the eyes of patients.

It also is an object of my invention to provide an eye testing apparatus comprising a casing consisting of two parts which are hinged together, which parts are adapted to be adjusted into open position and held in such open position to expose simultaneously different parts of the apparatus which may be employed in the examination and testing of a person's eyes.

A further object of the invention is to provide a portable eye testing apparatus comprising means whereby the various parts thereof may be assembled in compact relation to each other within a casing to thereby facilitate the carrying of the said apparatus from place to place.

A still further object of the invention is to provide a portable eye testing apparatus comprising a casing having a main or body portion and a lid portion, the two portions being hinged together, the one portion supporting illuminating means and the other supporting test cards, the said illuminating and test cards being placed in cooperative relation to each other upon opening of the lid portion with respect to the main or body portion.

Without attempting to enumerate at this point in the specification the further objects and advantages of my invention I shall proceed with a detailed description of the same.

In order that the invention may be readily understood and its practical advantages fully appreciated reference should be had to the accompanying drawings wherein I have illustrated one embodiment of the invention in the form which at present is preferred by me. However, it will be understood that the invention may be embodied in other forms of construction than that shown and that changes in the details of construction may be made within the scope of the claims without departing from the said invention.

In the drawings:

Fig. 1 is a view in perspective of an apparatus embodying the invention supported in elevated position and ready for use;

Fig. 2 is a view in end elevation of the device with the parts inclosed within the casing consisting of two parts, which parts are shown in open position with respect to each other in Fig. 1;

Fig. 3 is a view in perspective of the closed casing shown in Fig. 2;

Fig. 4 is a view in elevation of the open side of the main or body portion of the casing shown in Figs. 1 and 2 with various parts of the structure assembled therein, and showing also a portion of the open side of the lid portion of the structure shown in Figs. 1 and 2;

Fig. 5 is a view in longitudinal section taken on the line 5—5 of Fig. 4 with the lid portion of the apparatus shown in closed position;

Fig. 6 is a similar view taken on the line 6—6 of Fig. 4;

Fig. 7 is a transverse sectional view taken in different planes along the angular dash and dot line 7—7 of Fig. 4; and Fig. 8 is a view showing a detail of the construction of the means for supporting the casing and the parts mounted therein in elevated position.

In the drawings I have shown at A a casing comprising a main or body portion 1 and a lid portion 2. The portions 1 and 2 are hingedly connected together along adjoining edges by means of hinges 3. When the said portions have been adjusted into open position, as shown in Fig. 1, they are held in such position by means of a bar 4 one end of which is pivotally connected to the inner side of an end wall of the portion 1 while the other is detachably engaged with a lug 5 upon the inner side of the adjoining end of the lid portion 2. When the parts 1 and 2 are in open position, as shown in Fig. 1, the upper end of the part 1 is open as indicated. When the said parts are in closed position, as shown in Figs. 2 and 3, the open end of the part 1 is closed by the relatively wide end 10 of the lid portion 2. The opposite ends of the latter are seated against shoulders 11 provided upon the inner sides of the upper ends of the opposite sides of the member 1 and are supported thereby.

When the apparatus is in use it is supported upon a standard comprising telescoping parts 12 and 13, the latter being tubular and being adapted to receive the former as shown. These two parts may be held in adjusted position with respect to each other by means of a binding screw 14. One end of the part 12 is provided with a head which is secured to the middle portion of a board 15 by means of fastening bolts 16. The lower end of the part 13 is provided with legs 17 which are adapted to be folded against and in parallel relation to the said portion 13. The bracing and holding portions 18 at such time also are moved upwardly into position parallel with and against the said portion 13.

When the device is in position for use, as shown in Fig. 1, the legs are held in angular relation to each other, as shown in said figure, by means of the parts 18, the upper ends of which are connected to a slidable sleeve 19 which may be held in adjusted position by means of a binding screw 20.

The bottom or closed end of the part 1 of the casing is provided with guides 21 which are located in adjoining relation to the opposite edges of the said bottom.

When it is desired to use the device the board 15, previously referred to, is placed in engagement with the said guides, the parts 12 and 13 having been previously placed in telescoping relation with respect to each other and the legs 17 having been adjusted into position to support the device.

When, however, it is desired to transport the device from one place to another the board 15 is disengaged from the guides 21, the parts 12 and 13 are separated from each other and the legs 17 and the braces 18 collapsed, as shown in Figs. 4 and 5 of the drawings. The board 15 is then placed in position in the open upper end of the part 1, being supported therein by the bar 22 which extends between the opposite sides of the part 1 and is located in adjoining relation to the outer or upper edges thereof, and also by lugs or projections 23 which are secured to the inner surfaces of the opposite sides of the said part in adjoining relation to the upper ends thereof. The upper edges of the bar 22 and the lugs 23 are located in the same plane.

After the board 15 is placed in position the lid portion 2 may be closed, the end 10 thereof moving into position above the board 15 and retaining the same upon the supports 22 and 23 therefor. The portion 12 when the board 15 is in position upon its supports 22 and 23 extends into the casing. The portion 13 with the legs 17 and the braces 18 in position against and in parallel relation to the said portion 13 is also mounted within the part 1.

For holding the said part 13 and the associated parts 17 and 18 in position I have provided upon the inner side of the closed end of the part 1 a lug or projection 25 which projects into the lower open end of the tubular member 13. The upper open end of the said member engages a projection 26 which is provided upon the underside of the board 15. After these parts have been placed in position and the lid closed and secured in closed position by the fastening means comprising the co-acting members 27 and 28 the said parts are retained in position.

The opposite sides of the lid portion 2 are provided with channels 30 for removably supporting test cards 31. These channels are of a width to hold the desired number of test cards.

For the purpose of illuminating the said cards when the lid portion is in open position, as shown in Fig. 1, I have provided illuminating means consisting of electric lights 35 which are mounted in a reflector 36 of trough shape which is supported in adjoining relation to what may be regarded as the front edge of the part 1. The opposite ends of the trough shaped reflector 36 are rotatably or pivotally supported by means of pivot screws 37 which extend into openings provided in brackets 38 which are mounted upon and project inwardly from the adjoining front edge portion of the part 1 of the casing. The projections 37 are rotatable in the openings provided in the brackets 38 so that the reflector 36 may be adjusted with its open side in proper relation to the open side of the lid portion 2 to illuminate the cards supported in the channels 30.

A supply of current to the lights 35 and to a light 40 is controlled by means of electric switches provided in a casing 41 mounted upon the inner side of the part 1 near one end thereof. The switch casing 1 is provided with projections 42 which are adapted to be engaged by means of a switch plug 43 connected to one end of a conducting wire 44, the opposite ends of which are provided with a plug of any suitable construction having connection with the source of electric current. When the device is not in use the plug 43 is placed in engagement with projections 45 upon a side of the part 1 of the casing and the conductor 44 folded up, as indicated in Fig. 4 of the drawings.

The light 40 is located in front of an opening 46 which is provided in the outer side of the part 1 of the casing. The purpose of the light 40 and of the hole 46 is to test the muscles of the eyes.

For the purpose of facilitating the transfer of the testing device or apparatus from one place to another I have provided the same with a handle 50.

It will be seen that by my invention I have provided an eye testing apparatus which is capable of being used practically for the testing of eyes and which also is readily portable from place to place.

Having thus described my invention what I claim and desire to secure by Letters Patent is:

1. A portable eye testing apparatus comprising a casing having a main part and a lid part, the two parts having hinged connection with each other and adapted to be adjusted into open position relative to each other, a support for holding the said casing in position for use, means for adjustably connecting said support to the said casing, and means for mounting the said support within the main part of the said casing to thereby increase the portable characteristic of the said apparatus.

2. A portable eye testing apparatus comprising a casing consisting of two parts hinged together which parts are adapted to be opened and closed, a support for the said apparatus, said support consisting of a plurality of parts which are detachably connected together and one of the said parts having a flat base portion for connection to the said apparatus, means provided in one of the parts of said casing for engaging the base part of the said support for supporting the same, additional means within the said casing for engaging the other of the parts of said support for supporting the same, and means carried by one of the parts of the said casing for overlying the base portion of the first named part of the said support when the casing is closed for retaining the same within the said casing.

In testimony that I claim the foregoing as my invention I have hereunto signed my name this 28th day of April, A. D. 1930.

FREDERICK HARKER.